Aug. 10, 1948.  R. S. ARMSTRONG  2,446,734
TUBE CUTTING DEVICE
Filed Aug. 3, 1946  2 Sheets-Sheet 2
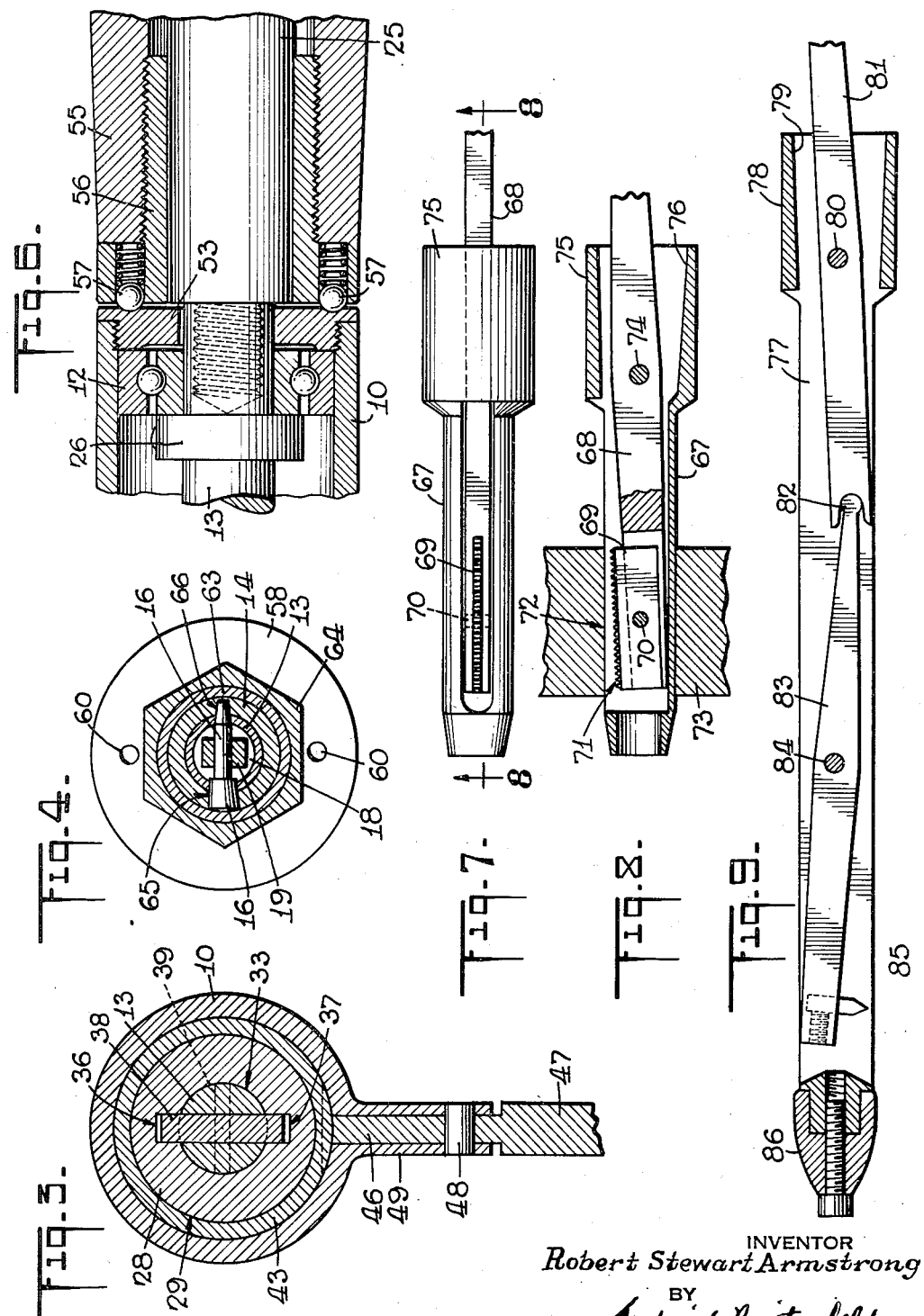
INVENTOR
Robert Stewart Armstrong
BY
Frederick Breitenfeld
ATTORNEY Patented Aug. 10, 1948

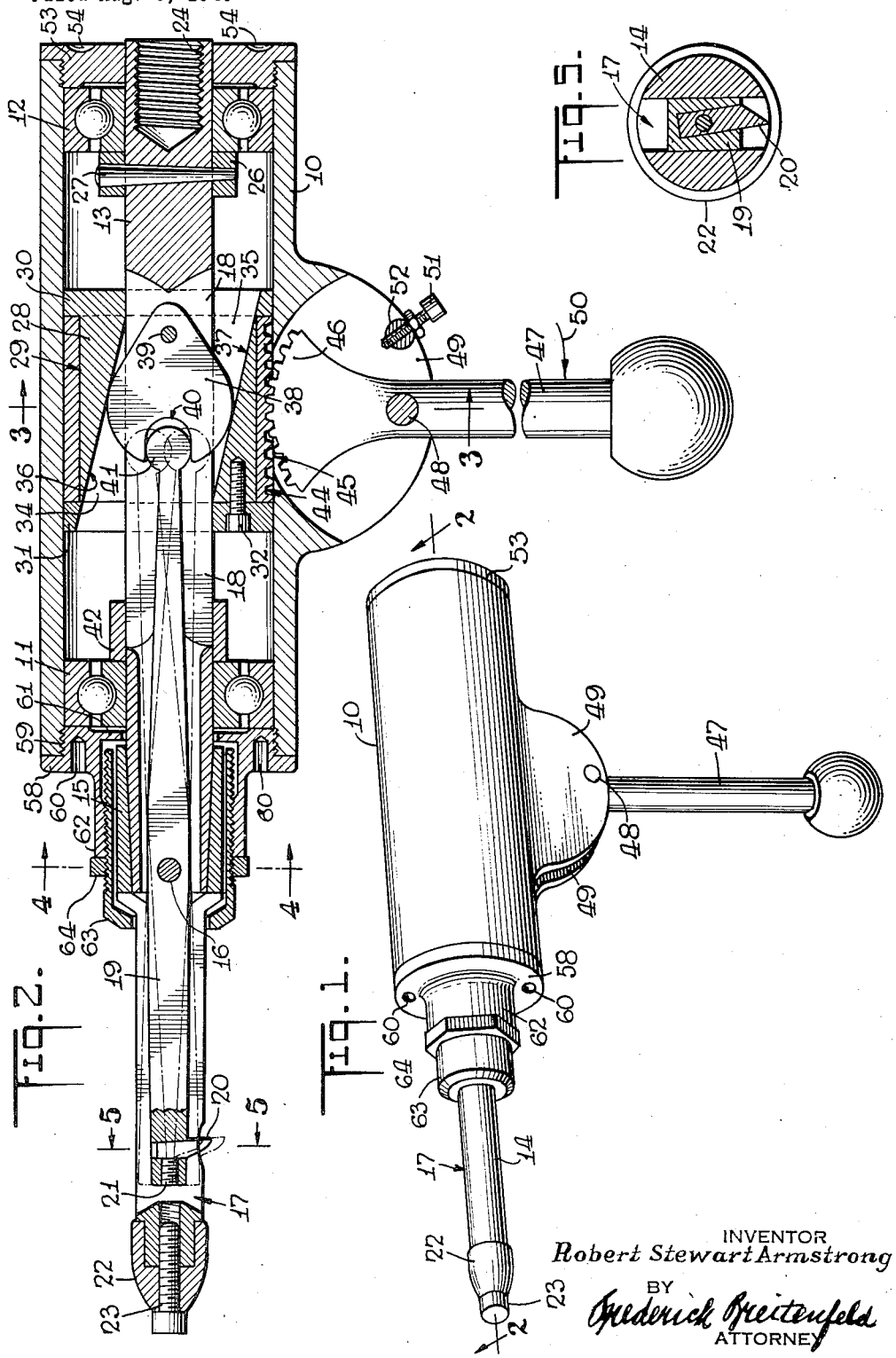

2,446,734

UNITED STATES PATENT OFFICE 2,446,734

TUBE CUTTING DEVICE

Robert Stewart Armstrong, Leonia, N. J.

Application August 3, 1946, Serial No. 688,279

19 Claims. (Cl. 30—108)

My present invention relates to tube cutting tools of the general character illustrated and described in U. S. Patent No. 1,883,453.

In the servicing of heat-exchange apparatus, such as condensers, boilers, and the like, in which a multiplicity of tubes are arranged in a parallel group, it frequently becomes necessary or desirable to cut a tube adjacent to its end, in order to facilitate its withdrawal from the apparatus, or to permit a stretching of the longer remaining portion after the severed end portion has been removed. The nature of the apparatus requires that such a cutting procedure be carried out from the interior of the tube, i. e., by means of a cutter inserted into the tube itself and adapted to exert its cutting effect outwardly upon the interior surface of the tube wall.

A tool suitable to accomplish this general objective is exemplified in the aforementioned patent, and is characterized by a rotatable spindle which has a forward end adapted to enter the tube to be cut, the inserted spindle end carrying a cutter mounted for radial emergence and retraction with respect to a longitudinal slot in the spindle, and an exteriorly-accessible means being provided for controlling the radial movements of this cutter during an uninterrupted rotation of the spindle.

It is a general object of the present invention to provide such a device in an improved structural embodiment, whereby its manufacture and assembly are simplified and rendered more economical, and whereby certain shortcomings have been obviated and certain new advantages achieved.

Among the more particular objects sought to be achieved by the present improved design are greater compactness and lighter weight, easier and more efficient manipulation by a single operator, and greater cutting power and reliability. Of particular importance is an enhanced simplification in the dismantling of the several parts, not only to facilitate repair and replacement of worn parts, but also to make the structure more speedily adjustable, by selective employment of interchangeable cutters and other parts, for different types of use, e. g., for employment with tubes of differing sizes and wall thickness.

A preferred embodiment of the improved structure, whereby I am enabled to achieve these objects and advantages, and such other objects and advantages as may hereinafter appear or be pointed out, is illustratively exemplified in the accompanying drawings, in which:

Figure 1 is a perspective view of the improved tube cutter;

Figure 2 is an enlarged longitudinal cross-section taken substantially along the line 2—2 of Figure 1;

Figures 3, 4 and 5 are fragmentary cross-sectional views taken substantially along the lines 3—3, 4—4 and 5—5 of Figure 2;

Figure 6 is a longitudinal cross-sectional view of the rear end of the device in association with a source of motive power;

Figure 7 is an elevational view of a modified type of separable spindle and which may under certain circumstances be used in place of the spindle end shown in Figure 2;

Fig. 8 is a cross-sectional view taken along the line 8—8 of Figure 7; and

Figure 9 is a view similar to Figure 8, showing another modified spindle end, for use with the cutter under certain circumstances.

A substantially cylindrical housing wall 10, preferably composed of light material such as aluminum, is provided near its opposite ends with ball-bearing anti-friction rings or bearings 11 and 12. Journaled for rotation in these bearings is the body portion 13 of a shaft or spindle which includes the separable forwardly-projecting spindle end 14 (Figure 1). These spindle sections 13 and 14 are connected in overlapping relation, and I have illustratively shown the preferred way of forming a rearward skirt 15 on the spindle end 14, the interior surface of this skirt being tapered. The forward portion of the body 13 of the spindle is correspondingly tapered on its exterior. The sections 13 and 14 are held together by a pin 16 which extends transversely through the overlapping portions of the spindle.

The forward and rearward spindle sections are provided with aligned longitudinal slots 17 and 18, and the spindle portions between these slots (i. e., in the region of the pin 16) are tubular. Pivotally mounted on the pin 16 is a bar or shank 19 of substantially rectangular cross-section having portions extending forwardly and rearwardly into the slots 17 and 18 respectively. At its forward end, the shank 19 is secured to a cutter 20, this cutter being preferably mounted in a removable or changeable manner, as by means of a set screw 21.

Rocking movements imparted to the shank 19 will obviously cause corresponding radial movements of the cutter 20, and the latter may thus be described as being mounted in the slot 17 for radial emergence and retraction.

At the extreme forward end of the spindle section 14, a nose-piece or tip 22 is mounted. This mounting is preferably of a removable character, the nose being held in position by the stud 23 engaging with a suitable threaded opening in the spindle end, so that nose pieces of varying diameters may be selectively applied.

At its rear end, the main spindle section 13 is provided with a threaded bore 24 adapted to receive a correspondingly threaded pin on the forward end of a drive shaft 25 (Figure 6). Immediately in front of the bore 24, a thrust collar 26 is mounted on the spindle section 13, held in position, for example, by means of the pin 27.

Mounted on the spindle 13, forwardly of the collar 26, is a camming member 28. This member is in operative engagement with the rear end of the shank 19, as will presently be explained, and is mounted on the spindle 13 in such a way that it rotates with the latter and is nevertheless axially shiftable with respect thereto.

The camming member 28 is substantially spool-shaped. It has an exterior surface 29 which is cylindrical, and it is provided at its opposite ends with flanges 30 and 31. At least one of these flanges is formed as a separate piece, e. g., the flange 31, and is secured to the body of the camming member 28 by means of studs 32 or the like. Centrally thereof, the member 28 is provided with a bore 33 (Figure 3) through which the spindle 13 passes. Communicating with this bore, and extending radially from the latter in opposite directions, are the slots 34 and 35. The floors 36 and 37 of these slots are substantially parallel to each other, and oblique with respect to the longitudinal axis of the spindle.

The cam follower 38 is a flat element mounted within the slot 18 and pivoted to the spindle at its rear end 39. At its forward end, the element 38 is provided with a recess 40 engaging the rounded rear end 41 of the shank 19. The cam follower 38 is a lever of the third class. When the camming member 28 is shifted axially, the cam follower 38 rocks about the pivot 39, and thus imparts corresponding transverse movements to the rear end 41 of the shank 19. This serves to rock the shank around the pivot 16, and brings about corresponding radial movements of the cutter 20.

Rearward movements of the camming member 28 are limited by the thrust collar 26. Forward movements may be limited by a collar 42 encircling the spindle behind the bearing 11.

The axial movements of the camming member 28 are effected through the intermediary of a sleeve 43 which is rotatably mounted on the cylindrical surface 29 and which is provided with a longitudinal gear rack 44. In the wall 10 of the housing there is a longitudinal aperture 45 through which the rack 44 is exposed. Meshing with the rack is a gear segment 46 carried on the inner end of a control handle 47. This handle is mounted on the housing for adjustments in a longitudinal plane. I prefer to pivot the handle 45 upon a transverse pin 48 extending between parallel ears 49 formed on the housing wall 10.

The forward movements of the handle 47 (i. e., in the direction of the arrow 50) may be limited by an adjustable stop 51 mounted in a bridge piece 52 extending between the ears 49.

The rear end of the housing is preferably finished by the application of an end plate 53 in screw-threaded engagement with the housing wall 10. In the illustrated embodiment, this plate is provided with a series of circumferentially spaced shallow recesses 54. The function of these recesses is shown most clearly in Figure 6. Mounted in the forward end of the housing 55 of the source of motive power is a bearing 56 within which the driving shaft 25 is journaled. The housing 55 is provided with one or more spring-pressed detent portions 57 which engage yieldably within selected recesses 54.

At the forward end of the housing wall 10, I mount an element 58 which is in screw-threaded engagement, as at 59, with the housing wall 10, and which is provided with two diametrically opposed holes 60 (see Figure 4) adapted to receive a suitable turning tool or wrench. The element 58 is provided with an internal flange portion 61 which is disposed behind the edge of the skirt 15. The element 58 is also provided with the interiorly threaded neck 62 within which a gauge member 63 is threaded. By turning the member 63, its forward end may be positioned at various selected distances from the cutter 20, and a lock nut 64 serves to hold the member 63 in any adjusted position.

In operation, the spindle 13 is first operatively connected to the driving shaft 25, as indicated in Figure 6, and the forward projecting portion of the rotatable spindle is inserted into the tube to be cut. The extent of insertion is limited by the abutment of the element 63 against the tube sheet or other wall within which the tube is mounted. The extent of insertion is determined, in advance, by the objective to be achieved, and by the thickness of the tube sheet.

Needless to say, during the period of insertion, the cutter 20 is retained in a retracted position with respect to the slot 17. Then, when the desired cutting is to be accomplished, the operator simply presses the handle 47 in the direction of the arrow 50. As viewed in Figure 2, this serves to shift the camming member 28 rearwardly, swings the cam follower 38 in a clockwise direction, rocks the shank 19 in a counter-clockwise direction, and thus causes the cutter 20 to emerge from the slot 17. The degree of emergence will depend, of course, upon the thickness of the wall of the tube which is being cut. Since the spindle is continuously rotating, under the driving force of the shaft 25, the cutter 20 will rapidly bite into and cut through the tube.

Upon completion of the cutting, the handle 47 is restored to its normal position to retract the cutter 20, and the device is withdrawn from the tube and is ready for a subsequent similar operation.

During the use of the device, the operator does nothing more than to support the housing 10 with one hand, insert the spindle to the proper predetermined extent, and then manipulate the handle 47. By constructing the parts in such a way that this handle manipulation is in a longitudinal plane, and by mounting the cutter 20 so that its emergence from the slot 17 is brought about by a forward movement of the handle 47, the operation is caused to be unusually reliable and sure. The forward pressure upon the handle 47 aids the operator in holding the device firmly in position against the tube sheet, and avoids the possibility of disturbing the proper disposition of the cutter during the cutting procedure.

As a further aid to the operator, the detent means 57 is effective. The shaft 25 forms part of a source of motive power, such as an electric motor or its equivalent, which is customarily suspended on cables or the like to permit manipulations of the cutter into and out of the successive tubes which are to be cut. By virtue of its weight, and its suspended condition, the motor and all its parts, including the housing 55 and the bearing 56, are firmly anchored against rotation. By effecting an engagement between the housing 55 and the housing 10, through the detent means, the housing of the tube cutter is itself secured and anchored against rotation. Also, in difficult situations, the housing 10 can be adjusted into an angularity in which the handle 47 is not in the vertical disposition shown in the present drawings; and the detent means serves to hold the housing 10 in a secure manner in any such adjusted position.

Obviously, if desired, the recesses 54 may be provided on the housing 55, and the detent portions 57 may be mounted on the element 53. Any number of recesses 54 may be provided, and there may be one or more of the detent elements 57. I prefer to use detents 57 in a number equal to that of the recesses 54.

It is frequently desirable to adjust the present device for different uses. I have already pointed out how the nose piece 22 may be readily replaced by another, and how the tool 20 may itself be readily replaced in case it wears out, or in case a tool of different shape or size is desirable. Another adjustment which is customarily resorted to is a replacement of the shank 19 or of the spindle end 14. To facilitate this, the pin 16 is caused to be tapered, as shown most clearly in Figure 4. That is, the opposite end portions 65 and 66 lie along a predetermined conical surface, and openings of corresponding taper are provided in the overlapping portions of the spindle. The central part of the pin 16, i. e., the part which serves as a pivot for the shank 19, is preferably cylindrical.

The procedure involved in separating the spindle parts is very simple. The nut 64 is loosened, and the element 63 is unscrewed from the element 58. The pin 16 is then withdrawn. A proper tool is then applied to the openings 60, and as the element 58 is turned to separate it from the housing wall 10, the portion 61 encounters and presses forwardly against the rear edge of the skirt 15. This serves to loosen the engagement between the tapered surfaces between the spindle sections, and the forward section is readily withdrawn. The shank 19 is then also free for withdrawal.

Should it be desired to disassemble the parts to a further extent for purposes of inspection, repair, or otherwise, the pin 48 (which is preferably tapered) is withdrawn to release the handle 47. The entire spindle 13 may then be withdrawn forwardly, carrying with it the bearing 11. A re-assembly of the parts is accomplished in the same simple manner.

As illustrative of the types of auxiliary parts which may be employed with the device, I have shown, in Figures 7–8, a spindle end 67 in association with a shank 68 which carries a burring cutter 69. The latter may be pivoted or otherwise secured to the shank as at 70, and is provided with a broad operative face 71 adapted to press against the wall 72 of an opening in a tube sheet 73. This action causes a roughening of the wall 72, so that when a tube is ultimately rolled into association with the tube sheet 73, it will fit more tightly.

The rear end of the shank 68 may be constructed the same as that of the shank 19 hereinbefore described. A pin 74 corresponds to the pin 16. The skirt 75 corresponds to the skirt 15, and is provided with a tapered inner surface 76 adapted to fit over the tapered forward end of the spindle section 13.

The term "cutter" as used in the appended claims is intended to include within its scope a cutting tool of the character indicated at 69; and the term "tube" is intended to include within its scope an opening of the character indicated at 72; since the action of the device in burring the opening of the wall 72 is substantially the same as that which takes place when a cutter of the kind shown at 20 is caused to penetrate through a tube wall.

In Figure 9 I have indicated an interchangeable spindle end which may be advantageously employed in case the tube sheet is of unusual thickness or depth. The spindle end 77 is provided, as before, with the rearward skirt 78 having the interior tapered surface 79. The transverse pivot pin 80 corresponds to the pin 16, and the shank 81 corresponds to the shank 19. However, at the forward end of the shank 81, an articulation is established with the rear rounded end 82 of an extension shank 83. The latter is pivoted at 84 within the longitudinal slot of the spindle, and carries a cutter 85 at its forward end. A nose piece 86 may be provided at the forward end, as hereinbefore described.

When the device of Figure 9 is attached to the spindle section 13, as hereinbefore described, the operative portion of the tool may be inserted into a tube to a greater extent than would otherwise be possible. If desired, the gauge member 63 may at the same time be replaced by a similar member of longer character. Then, by the procedure hereinbefore described, the spindle is rotated, and when the operating handle is adjusted to rock the shaft 81, a corresponding rocking movement is imparted to the extension shank 83, thus causing radial emergence of the cutter 85.

In a similar fashion, shanks of various kinds and sizes, designed for tubes of varying diameters and wall thicknesses, may be readily attached to the tool, the ultimate operation being always substantially like that which has been described.

Among the advantages of the present structure are those which relate to the simplification of its manufacture. As will be understood by those skilled in the art of tool design, all of the present parts are readily creatable by relatively simple machining operations. For example, the slots in the spindle sections require nothing more than simple drilling and milling operations. The same is true with respect to the camming member 28.

One other advantage of the improved construction lies in the enhanced leverage which is afforded to the operator in causing the cutter to emerge from its slot. The interposition of the cam follower 38 between the camming surfaces 36—37 and the shank, and the design of this cam follower in the form of a lever of the third class, affords a great mechanical advantage, whereby a relatively small force applied to the control handle 47 will result in applying a considerably greater force to the cutter emerging from the slot and biting into the tube which is to be cut.

In general, except as hereinafter specified in the claims, it will be understood that the details herein described and illustrated are merely illustrative, and that they may readily be changed in many respects by those skilled in the art without necessarily departing from the spirit and scope of the invention as expressed in the claims.

Having thus described my invention and illustrated its use, what I claim as new and desire to secure by Letters Patent is:

1. In a tube cutter, a housing provided with a longitudinal aperture in a wall thereof, a spindle journaled in the housing and provided with a longitudinally slotted projecting end adapted to be inserted into the tube to be cut, a shank pivoted to the spindle, a cutter carried by said shank and mounted within said slot for radial emergence and retraction, a camming member within the housing and mounted on the spindle for rotation therewith but axially shiftable with respect thereto, means between said member and said shank for translating axial movements of said member into rocking movements of said shank which thereby effect corresponding radial movements of the cutter, an exterior control handle mounted on the housing for adjustment in a longitudinal plane, and means carried by said handle and projecting into the housing through said aperture for controlling the axial movements of said camming member.

2. In a tube cutter, the combination with the elements set forth in claim 1, of a sleeve rotatably mounted on said camming member and provided with a longitudinal gear rack, said controlling means comprising a gear segment meshing with said rack.

3. In a tube cutter, the structure set forth in claim 1, said handle being pivotally secured to the housing for rocking movements in said longitudinal plane.

4. In a tube cutter, the combination with the elements set forth in claim 1, of a sleeve rotatably mounted on said camming member and provided with a longitudinal gear rack, said handle being pivotally secured to the housing for rocking movements in said longitudinal plane, and said controlling means comprising a gear segment meshing with said rack.

5. In a tube cutter, the combination of elements set forth in claim 1, said translating means comprising a cam follower interposed between said shank and camming member, said follower comprising a lever pivoted to and rotatable with the spindle and engaging the rear end of said shank.

6. In a tube cutter, the combination of elements set forth in claim 1, said translating means comprising a cam follower interposed between said shank and camming member, said follower comprising a lever of the third class pivoted to and rotatable with the spindle and engaging the rear end of said shank.

7. In a tube cutter, a housing provided with a longitudinal aperture in a wall thereof, a spindle journaled in the housing and provided with a longitudinally slotted projecting end adapted to be inserted into the tube to be cut, a shank pivoted to the spindle, a cutter carried by said shank and mounted within said slot for radial emergence and retraction, a camming member within the housing and mounted on the spindle for rotation therewith but axially shiftable with respect thereto, said camming member being provided with a bore through which the spindle passes and a longitudinal slot extending radially from said bore, the floor of said slot defining an oblique camming surface, a cam follower mounted in said slot and engaging the rear end of the shank, whereby axial movements of said camming member will rock the shank and thereby effect corresponding radial movements of the cutter, and exteriorly controllable means projecting into the housing through said aperture for controlling the axial movements of said camming member.

8. In a tube cutter, the structure set forth in claim 7, said cam follower comprising a lever of the third class pivoted to and rotatable with the spindle.

9. In a tube cutter, the structure set forth in claim 7, said controlling means comprising a sleeve rotatably mounted on said camming member and provided with a longitudinal gear rack, a handle pivotally secured to the housing for rocking movements in a longitudinal plane, and a gear segment carried by the handle and meshing with said rack.

10. In a tube cutter, a housing, a spindle journaled therein and including a projecting end adapted to be inserted into the tube to be cut, said projecting end being provided with a longitudinal slot, a shank pivoted to the spindle, and a cutter carried by said shank and mounted within said slot for radial emergence and retraction, said projecting spindle end and the body of the spindle being formed as separable sections having tapered surfaces adapted to engage in overlapping relation.

11. In a tube cutter, a housing, a spindle journaled therein and including a projecting end adapted to be inserted into the tube to be cut, said projecting end being provided with a longitudinal slot, a shank pivoted to the spindle, a cutter carried by said shank and mounted within said slot for radial emergence and retraction, said projecting spindle end and the body of the spindle being formed as separable sections having tapered surfaces adapted to engage in overlapping relation, and an element in screw-threaded engagement with the housing and adapted, when turned, to engage the end section of the spindle and thereby facilitate its separation from the spindle body.

12. In a tube cutter, a housing, a spindle journaled therein and including a projecting end adapted to be inserted into the tube to be cut, said projecting end being provided with a longitudinal slot, a shank pivoted to the spindle, a cutter carried by said shank and mounted within said slot for radial emergence and retraction, said projecting spindle end and the body of the spindle being formed as separable sections having tapered surfaces adapted to engage in overlapping relation, the tapered surface of the end section being on the interior of a skirt adapted to fit over the forward end of the spindle body, and an element in screw-threaded engagement with the housing and adapted, when turned, to engage the rear edge of said skirt and thereby facilitate the separation of said end section from the spindle body.

13. In a tube cutter, a housing, a spindle journaled therein and including a projecting end adapted to be inserted into the tube to be cut, said spindle being provided with a longitudinal slot, a shank mounted within said slot and pivoted at its midportion to said spindle, and a cutter at one end of the shank adapted for emergence and retraction with respect to said slot when the shank is rocked, said projecting spindle end and the body of the spindle being formed as separable sections having tapered surfaces adapted to engage in overlapping relation, the pivot of said shank comprising a pin extending transversely through the overlapping portions of said spindle sections.

14. In a tube cutter, the structure set forth in claim 13, said pivot pin being itself tapered to facilitate its withdrawal to allow removal of said shank from said slot.

15. In a tube cutter, a spindle provided with a longitudinal slot, one end of the spindle being adapted to be inserted into the tube to be cut, a shank mounted in said slot and pivoted at its mid-portion to said spindle, a cutter carried by the forward end of said shank, a camming member mounted on the rear end of the spindle for rotation therewith but axially shiftable with respect thereto, and a cam follower mounted in said slot and engaging the rear end of the shank, said camming member and cam follower being so related that axial movements of the camming member will cause said shank to rock and thereby effect corresponding radial movements of said cutter.

16. In a tube cutter, a housing, a spindle journaled therein and provided with a forward projecting cutting end adapted to be inserted into the tube to be cut, a second housing anchored against rotation, a driving shaft mounted in said second housing and operatively connected to the rear end of said spindle, and detent means between said housings for yieldably securing said first-named housing to said second housing, thereby yieldably anchoring said first-named housing against rotation.

17. In a tube cutter, the structure set forth in claim 16, said detent means comprising a series of circumferentially arranged recesses in one of said housings and a spring-pressed detent carried by the other of said housings and adapted to engage with a selected one of said recesses.

18. In a tube cutter, a spindle comprising separable forward and rearward sections adapted to be connected in overlapping relation, said sections being provided with aligned longitudinal slots, a shank pivoted to said sections where they overlap and projecting forwardly and rearwardly into said slots respectively, and a cutter carried by the forward end of said shank, whereby rocking movements imparted to the latter will effect corresponding radial movements of said cutter.

19. In a tube cutter, a spindle comprising separable forward and rearward sections adapted to be connected in overlapping relation, said sections being provided with aligned longitudinal slots, a shank pivoted to said sections where they overlap and projecting forwardly and rearwardly into said slots respectively, an extension shank mounted in the forward slot and pivoted only to the forward section, a cutter carried by the forward end of said extension shank, and means articulating the rear end of the extension shank to the forward end of the other shank so that rocking movements imparted to the latter will effect corresponding radial movements of said cutter.

ROBERT STEWART ARMSTRONG.